United States Patent
Sasaki et al.

(10) Patent No.: US 7,102,332 B1
(45) Date of Patent: Sep. 5, 2006

(54) CONTROL APPARATUS FOR AUTOMOTIVE GENERATOR

(75) Inventors: Junya Sasaki, Tokyo (JP); Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/244,152

(22) Filed: Oct. 6, 2005

(30) Foreign Application Priority Data

Apr. 21, 2005 (JP) .............................. 2005-123515

(51) Int. Cl.
*H02H 7/06* (2006.01)
*H02P 9/00* (2006.01)
*H02P 99/00* (2006.01)

(52) U.S. Cl. ........................................ 322/28; 322/24

(58) Field of Classification Search ................. 322/28, 322/24, 26, 38, 25, 44, 59; 363/89; 307/10.1
See application file for complete search history.

(56) References Cited

U.S. PATENT DOCUMENTS

| | | | |
|---|---|---|---|
| 5,177,677 A * | 1/1993 | Nakata et al. ................. 363/89 |
| 5,448,154 A * | 9/1995 | Kanke et al. ................. 322/28 |
| 5,689,175 A * | 11/1997 | Hanson et al. ................. 322/28 |
| 5,767,636 A * | 6/1998 | Kanazawa et al. .......... 318/139 |
| 5,966,001 A * | 10/1999 | Maehara et al. ............... 322/28 |
| 6,275,398 B1 * | 8/2001 | Sumimoto et al. ............ 363/89 |
| 6,756,770 B1 * | 6/2004 | Watanabe et al. ............. 322/28 |
| 2001/0043055 A1 * | 11/2001 | Tanaka et al. ................. 322/28 |
| 2002/0191417 A1 * | 12/2002 | Suzuki et al. ................. 363/15 |
| 2005/0231174 A1 * | 10/2005 | Iwatani ........................ 322/25 |

FOREIGN PATENT DOCUMENTS

| JP | 2002-238295 A | 8/2002 |
|---|---|---|
| JP | 2002-281792 A | 9/2002 |

* cited by examiner

*Primary Examiner*—Julio C. Gonzalez
(74) *Attorney, Agent, or Firm*—Sughrue Mion, PLLC

(57) ABSTRACT

An A/D conversion device includes a counter for counting a clock signal fed from a clock signal generator, a D/A converter for converting a digital output of the counter into an analog value, a comparator for comparing an analog output of the D/A converter and an analog field current detection value fed from a current detecting resistor and outputting a result of comparison, an AND circuit for calculating a logical product of an output signal of the comparator and the clock signal fed from the clock signal generator and outputting the logical product to the counter, and a memory for storing the output of the counter according to a transfer signal. The output of the counter is reset when a reset signal is input thereinto.

7 Claims, 7 Drawing Sheets

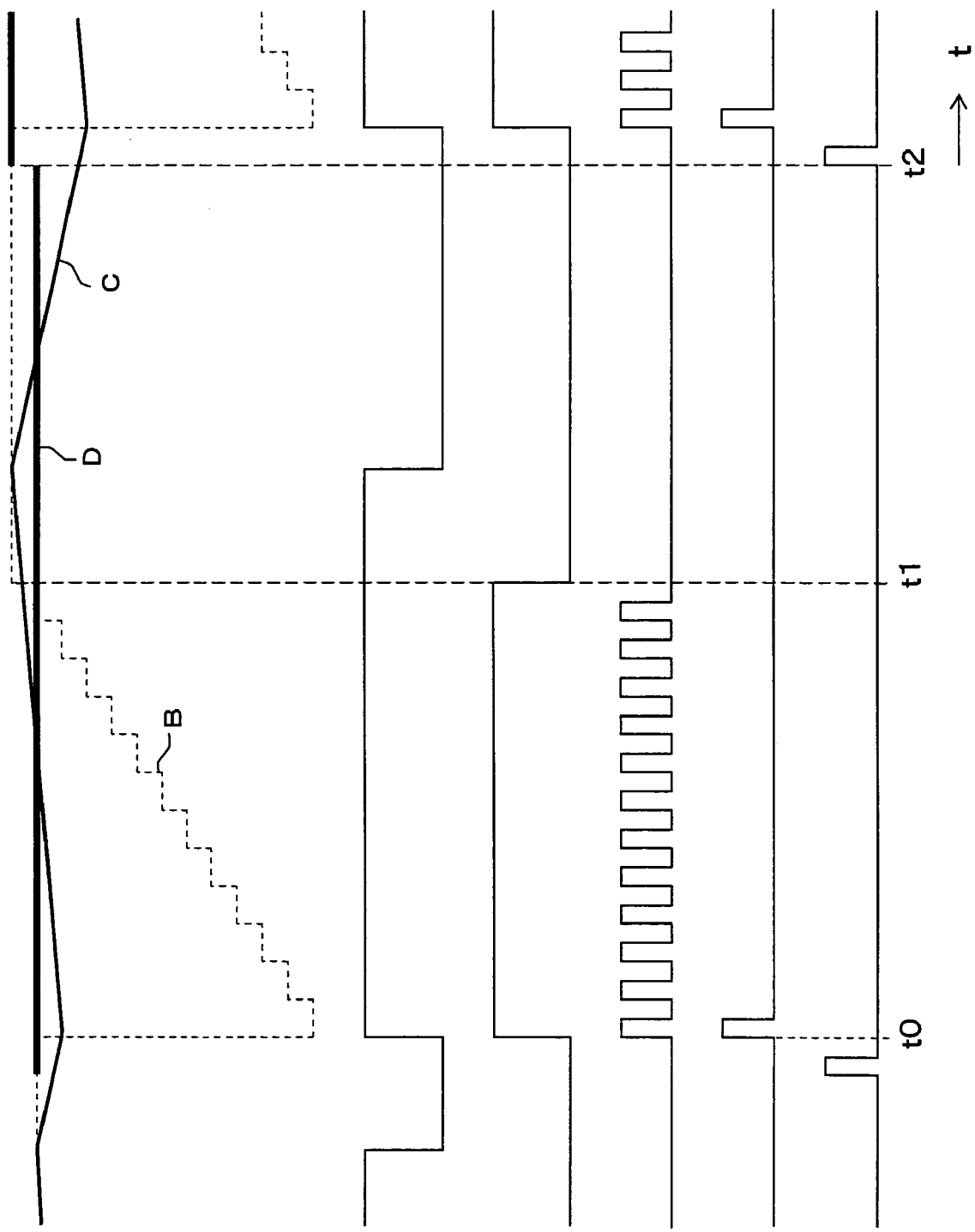

CONTROL APPARATUS FOR AUTOMOTIVE GENERATOR

BACKGROUND OF THE INVENTION

1. Field of the Invention

The present invention relates to a control apparatus for controlling an automotive generator installed on a vehicle according to a detected value of an electric current flowing through a field circuit of the generator and, more particularly, the invention pertains to an automotive generator control apparatus which is less susceptible to external noise or disturbances in detecting the value of an electric current flowing in a field circuit of the generator.

2. Description of the Background Art

Today, a common approach to improving fuel economy of an engine of a vehicle is to employ a system in which a control unit of the vehicle monitors power generation conditions of an automotive generator, estimates the amount of generator driving torque and controls engine speed, for instance. There exist some conventionally known methods of monitoring the amount of power generated by an automotive generator. One known method is to monitor the rate of switching on/off actions of a field current controlling transistor. This method however has a problem that the transistor ON/OFF rate does not necessarily correspond to the amount of the generator driving torque depending on operating conditions of the generator. Under such circumstances, there has been a need for a method of obtaining highly accurate information on the amount of power generated by the automotive generator. A solution to this problem is to monitor the value of a field current. For example, Japanese Patent Application Publication No. 2002-281792 discloses some methods of monitoring the value of a field current.

Since the value of a field current flowing in a field circuit of an automotive generator can be used as an important parameter for controlling the generator, it is necessary to monitor the field current value if the same is to be used for control purposes. Currently, there is a need for on-line transmission of the field current value to an engine control system. To alleviate work load applied to an electronic control unit (ECU) provided in a vehicle and to reduce the influence of noise induced in a transmission line, it is advantageous if the generator incorporates an analog-to-digital (A/D) converter so that the field current value is A/D-converted on the generator side and a resultant digital value is transmitted to the ECU.

A/D converters widely used in industrial applications are so-called successive approximation type A/D converters. Generally, the automotive generator is disposed in an engine room where the generator is exposed to extremely harsh ambient conditions so that the A/D converter, if used for controlling the generator, might be adversely affected by noise. The successive approximation type A/D converter determines the value of each bit by the method of false position, or the regula falsi method. Therefore, if noise is induced during execution of sampling operation by the A/D converter, a large amount of calculation error is likely to occur. Consequently, if the A/D converter of this kind is used in the automotive generator, there arises a problem that it is difficult to transmit a highly reliable field current value to the ECU.

SUMMARY OF THE INVENTION

The present invention is intended to overcome the aforementioned problems of the prior art. Accordingly, it is an object of the invention to provide an automotive generator control apparatus capable of providing useful information for controlling the generator by using an A/D converter which is less susceptible to external noise or disturbances in monitoring the value of a field current flowing in the generator with a minimum increase in circuit scale.

In one principal form of the invention, a control apparatus for controlling an automotive generator includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value and outputting the digital value to an external control unit, and a voltage control circuit for outputting an ON/OFF drive signal to the switching device such that the DC output voltage of the automotive generator follows a specific reference voltage by pulse width modulation (PWM) control operation performed at recurring cycles. The A/D conversion device includes a counter, a digital-to-analog (D/A) converter for converting a digital output of the counter into an analog value, a comparator for comparing an output of the D/A converter and the analog field current detection value, a counter control circuit for controlling the counter according to an output of the comparator such that the counter counts up when the output of the D/A converter is less than the analog field current detection value, reset means for resetting the output of the counter at a point in time immediately following a rising edge of the ON/OFF drive signal at intervals of a specific number of PWM control operation cycles, and transfer means for transferring the output value of the counter to the external control unit at a point in time immediately preceding the rising edge of the ON/OFF drive signal at intervals of a specific number of PWM control operation cycles.

In another principal form of the invention, a control apparatus for controlling an automotive generator includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value, a current limit value memory for storing a specific current limit value in digital form, a voltage control circuit for outputting an ON/OFF drive signal to the switching device such that the DC output voltage of the automotive generator follows a specific reference voltage by PWM control operation performed at recurring cycles, and a current limiter to which an output of the A/D conversion device and the current limit value are input, whereby the current limiter turns off the switching device when the output value of the A/D conversion device exceeds the current limit value regardless of the ON/OFF drive signal. The A/D conversion device includes a counter, a D/A converter for converting a digital output of the counter into an analog value, a comparator for comparing an output of the D/A converter and the analog field current detection value, a counter control circuit for controlling the counter according to an output of the comparator such that the counter counts up when the output of the D/A converter is less than the analog field current detection value, reset means for resetting the output of the counter at a point in time immediately following a rising edge of the ON/OFF drive signal at intervals of a specific number of PWM control operation cycles, and transfer means for transferring the output value of the counter to the current limiter at a point in time immediately preceding the rising edge of the ON/OFF drive signal at intervals of a specific number of PWM control operation cycles.

In the aforementioned automotive generator control apparatus of the invention, the A/D conversion device employs an output feedback system realized by using a counter. Therefore, even if the output of the counter contains noise, a resultant error, if any, always occurs at the least significant bit (LSB) only. Accordingly, the A/D conversion device of the automotive generator control apparatus can monitor the value of the field current flowing through the field coil of the generator with high accuracy and reliability without adverse effects of external noise. In addition, the automotive generator control apparatus of the invention can obtain a digital field current detection value closely duplicating the waveform of the field current actually flowing through the field coil with a simple circuit configuration at low cost.

These and other objects, features and advantages of the invention will become more apparent upon reading the following detailed description along with the accompanying drawings.

BRIEF DESCRIPTION OF THE DRAWINGS

FIGS. 3A to 3F are diagrams showing waveforms of signals observed at various points in the A/D converter circuit shown in FIG. 1;

DETAILED DESCRIPTION OF THE PREFERRED EMBODIMENTS OF THE INVENTION

The invention is now described with reference to specific embodiments thereof illustrated in the accompanying drawings.

First Embodiment

Figure 1:
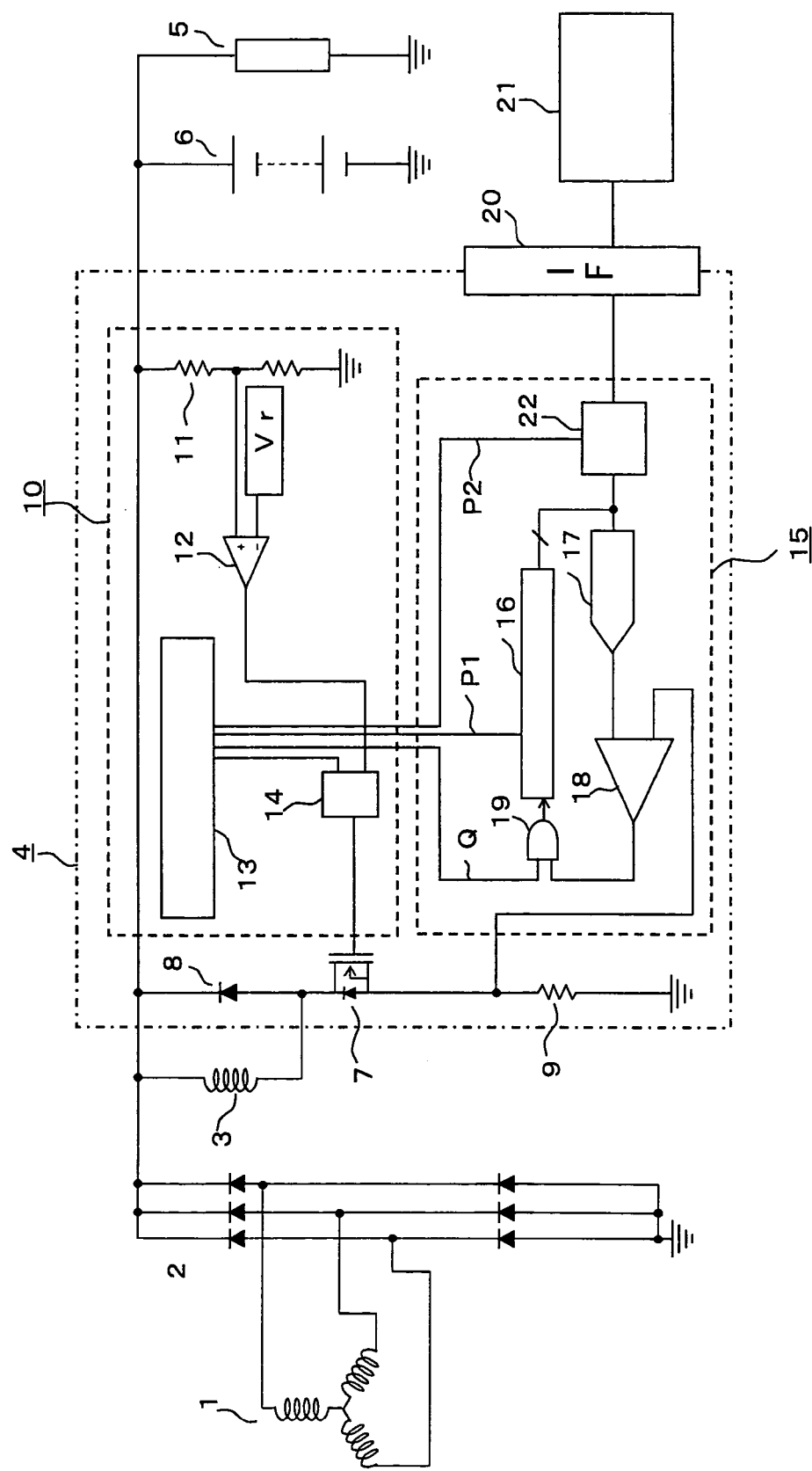
FIG. 1 is a block diagram of a control apparatus for controlling an automotive generator installed on a vehicle according to a first embodiment of the invention.

FIG. 1 is a block diagram of a control apparatus for controlling an automotive generator installed on a vehicle according to a first embodiment of the invention.

The automotive generator of the embodiment includes three-phase armature coils 1, a rectifier 2 for rectifying AC voltages output from the armature coils 1 to produce a DC voltage, a field coil 3 constituting a field circuit into which the DC voltage output from the rectifier 2 is supplied, and a voltage regulator 4 which will be later described in detail. The DC output voltage regulated to a constant voltage level by the voltage regulator 4 is supplied to various electric loads 5 and to a battery 6 for charging the same.

Next, an internal circuit configuration of the voltage regulator 4 which is enclosed by alternate long and short dashed lines is described. Referring to FIG. 1, the voltage regulator 4 includes a transistor 7 connected in series with the field coil 3, a diode 8 connected in parallel with the field coil 3, a current detecting resistor 9 connected in series with the transistor 7, a voltage control circuit 10 which is enclosed by broken lines, and an A/D converter circuit 15 which is also enclosed by broken lines.

The transistor 7 serves as a switching device of which switching on/off operation controls a field current flowing through the field coil 3. The diode 8 serves as a freewheeling diode for recirculating the current fed through the field coil 3 when the transistor 7 is in an OFF state. The current detecting resistor 9 serves as a field current detector for detecting the field current flowing through the field circuit.

The voltage control circuit 10 includes a resistance type voltage divider 11 for dividing the DC voltage output from the voltage regulator 4, a comparator 12 for comparing a divided voltage fed from the resistance type voltage divider 11 and a reference voltage Vr and outputting a result of comparison, and a logic circuit 14 for outputting an ON/OFF drive signal to the transistor 7 such that the aforementioned DC voltage output from the voltage regulator 4 will follow a specific reference voltage. The logic circuit 14 produces the ON/OFF drive signal from a signal fed from the comparator 12 and a signal fed from a clock signal generator 13 by PWM control operation performed at specific pulse repetition intervals (or recurring cycles).

Now, an internal circuit configuration of the A/D converter circuit 15 which is an A/D conversion device constituting a principal part of the invention is described. The A/D converter circuit 15 converts the value of the field current expressed in analog form (hereinafter referred to as the analog field current detection value) detected by the current detecting resistor 9 into a digital value. More specifically, the A/D converter circuit 15 includes a counter 16 for counting a clock signal Q fed from the clock signal generator 13, a D/A converter 17 for converting a digital output of the counter 16 into an analog value, a comparator 18 for comparing an analog output of the D/A converter 17 and the analog field current detection value fed from the current detecting resistor 9 and outputting a result of comparison, an AND circuit 19 for calculating a logical product of an output signal of the comparator 18 and the clock signal Q fed from the clock signal generator 13 and outputting the logical product (the result of logic operation performed by the AND circuit 19) to the counter 16, and a memory 22 for storing the output of the counter 16 according to a transfer signal P2 which will be described later.

Figure 2:
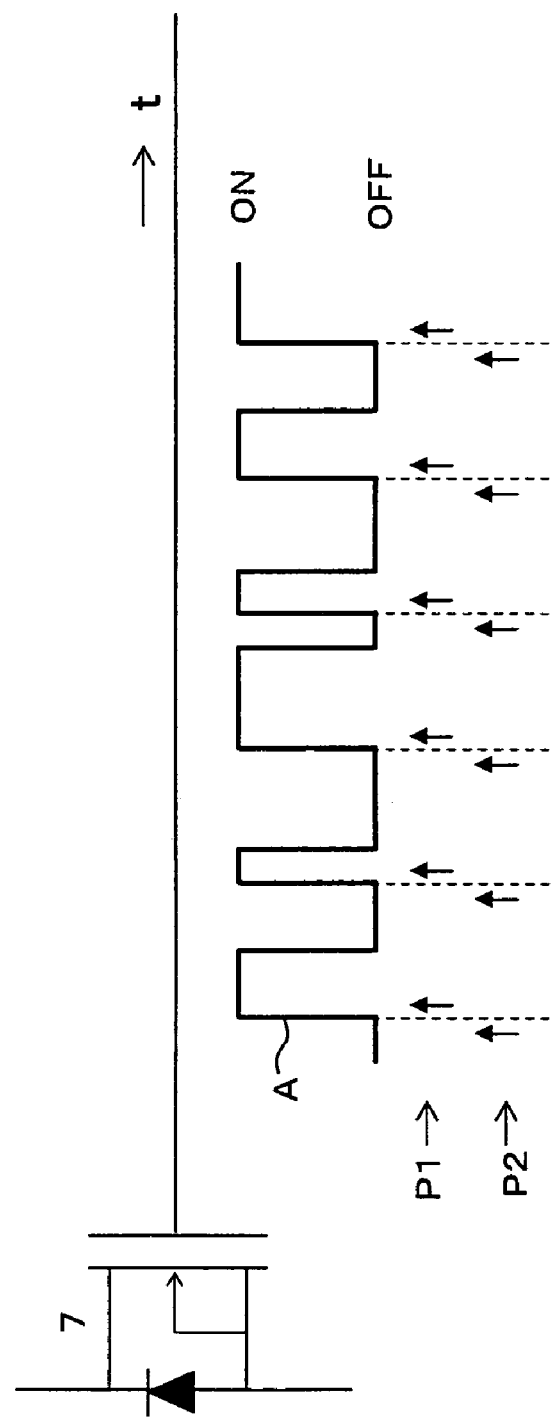
FIG. 2 is a diagram for explaining operation of an A/D converter circuit shown in FIG. 1.

Operation of the control apparatus of the embodiment is now explained. The logic circuit 14 outputs the ON/OFF drive signal to the transistor 7, in which the duration of on-time of successive pulses (or duty factor) of the ON/OFF drive signal is controlled by the PWM control operation according to the signal output from the comparator 12 in such a manner that the DC voltage output from the voltage regulator 4 will follow the aforementioned reference voltage. FIG. 2 shows a waveform of the ON/OFF drive signal marked by A which will be referred to in the following discussion.

Operation of the A/D converter circuit 15 is now explained with reference to FIG. 2 which is a diagram showing the ON/OFF drive signal A supplied to the transistor 7 and output timings of a reset signal P1 and the aforementioned transfer signal P2. The reset signal P1 and the transfer signal P2 which are produced by dividing the frequency of the clock signal Q are delivered to the counter 16 and the memory 22, respectively, the reset signal P1 serving as reset means and the transfer signal P2 serving as transfer means. In FIG. 2, intervals of successive pulses (ON state) of the ON/OFF drive signal A shown by broken lines correspond to the aforementioned recurring cycles of the PWM control operation (hereinafter referred to as the PWM control operation cycles).

As depicted in FIG. 2, the reset signal P1 is generated at a point in time immediately following (approximately a few tens of microseconds after) each rising edge of the ON/OFF drive signal A to reset the output of the counter 16 with this timing. On the other hand, the transfer signal P2 is generated at a point in time immediately preceding (approximately a few tens of microseconds before) each rising edge of the ON/OFF drive signal A, and the output of the counter 16 is transferred to the memory 22 with this timing.

The operation of the control apparatus is further explained with reference to FIGS. 3A to 3F which are diagrams showing waveforms of signals observed at various points during about one PWM control operation cycle. Referring to FIG. 3A, broken lines marked by B show the waveform of the output of the counter 16, a kinked thin solid line marked by C shows the waveform of the field current flowing through the field coil 3, and a thick solid line marked by D shows the waveform of an output of the A/D converter circuit 15. Shown in FIG. 3B is the waveform of the ON/OFF drive signal supplied to the transistor 7, shown in FIG. 3C is the waveform of a logic output of the comparator 18, shown in FIG. 3D is the waveform of a clock signal fed from the AND circuit 19 into the counter 16, shown in FIG. 3E is the waveform of the reset signal P1, and shown in FIG. 3F is the waveform of the transfer signal P2.

In the following discussion of the operation of the control apparatus illustrated in FIGS. 3A to 3F, timing to at which the ON/OFF drive signal supplied to the transistor 7 (FIG. 3B) rises is used as a starting point. The reset signal P1 (FIG. 3E) is generated (becomes High) at the timing t0, whereby the counter 16 is reset and the output of the counter 16 becomes a zero value. Consequently, the output of the comparator 18 becomes High (or the field current detection value fed from the current detecting resistor 9 becomes larger than the value fed back from the D/A converter 17 to the comparator 18) so that the clock signal Q fed from the clock signal generator 13 is delivered through the AND circuit 19 to the counter 16. At this point, the counter 16 begins to count up pulses of the clock signal Q. As a result of this count-up operation, the output B (FIG. 3A) of the counter 16 increases.

At this time, the A/D-converted output value D (FIG. 3A) of the A/D converter circuit 15 is held at an output value of the counter 16 which was transmitted to the memory 22 at a timing when the transfer signal P2 was generated one PWM control operation cycle earlier.

When the output value of the counter 16 becomes equal to the field current detection value fed from the current detecting resistor 9 at timing t1 as a result of the count-up operation of the counter 16, the logic output of the comparator 18 is reversed in polarity. Consequently, the AND circuit 19 stops outputting the clock signal Q to the counter 16. At this time, the counter 16 stops carrying out the count-up operation and holds the output value transmitted immediately before stopping the count-up operation.

When the transfer signal P2 (FIG. 3F) is generated (becomes High) at timing t2 immediately before one PWM control operation cycle comes to an end, the memory 22 updates the value stored therein with the output value of the counter 16 received at that point in time (timing t2).

The earlier-mentioned conventional successive approximation type A/D converter determines whether the value of each successive bit, from the most significant bit (MSB) to the least significant bit (LSB), is 0 or 1. Therefore, if the MSB is accidentally contaminated by noise and the A/D converter misjudges the value of the MSB, a great error will occur in a digitized output of the A/D converter.

By comparison, the A/D converter circuit 15 of the present embodiment does not judge whether the value of the MSB is 0 or 1, but the counter 16 always outputs the value 0 or 1 corresponding to the level of the LSB. Accordingly, even if the output of the counter 16 is accidentally contaminated by noise, a resultant error is almost negligible.

It follows that even if the automotive generator control apparatus of the embodiment is installed in an engine room where the A/D converter circuit 15 is exposed to harsh ambient conditions full of electromagnetic interference and conducted noise, the control apparatus can output a highly reliable digital field current detection value to an external control unit 21 which is an ECU of the vehicle via a communication interface 20.

Figure 4A:
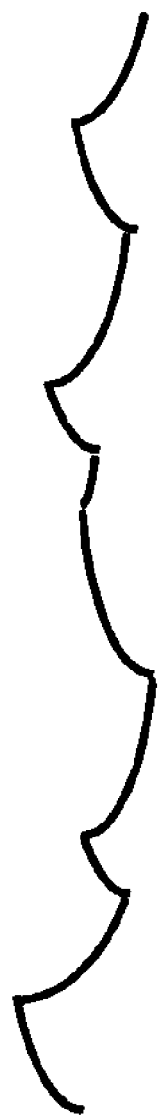
FIGS. 4A and 4B are diagrams showing waveforms observed over a longer time period than shown in FIGS. 3A to 3F.
Figure 4B:
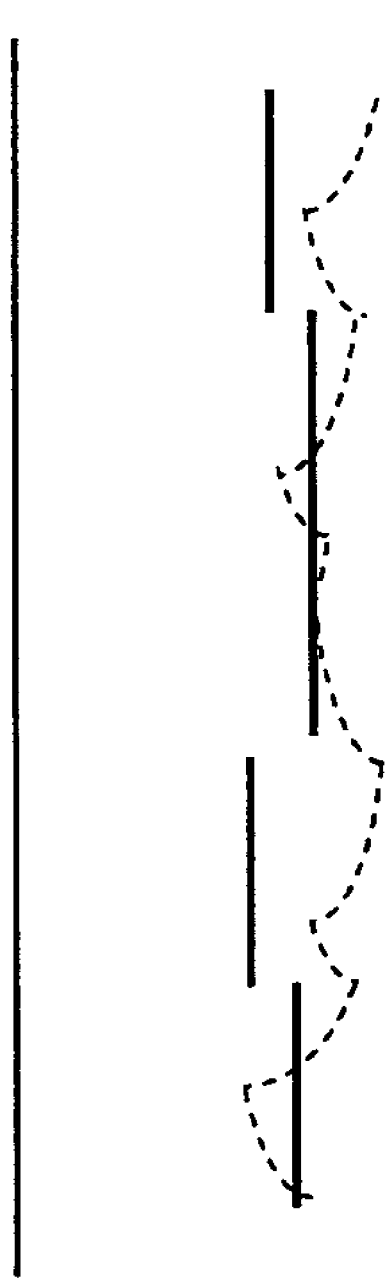

FIGS. 4A and 4B are diagrams showing waveforms observed over a longer time period than shown in FIGS. 3A to 3F. Specifically, shown in FIG. 4A is the waveform of the field current flowing through the field coil 3, and shown in FIG. 4B is the waveform of the output of the A/D converter circuit 15 of this embodiment.

In the field circuit of FIG. 1, the DC output voltage is applied to the field coil 3 and the field current flows from the field coil 3 through the transistor 7 and then through the current detecting resistor 9 during an ON period of the transistor 7. When the transistor 7 turns off, the current flowing through the field coil 3 flows through the diode 8 but the current which has been flowing through the current detecting resistor 9 is interrupted, so that the voltage applied to the current detecting resistor 9 becomes zero. Therefore, the waveform of the field current value monitored by the current detecting resistor 9, or the waveform input into the A/D converter circuit 15, becomes considerably different from the waveform of the field current actually flowing through the field coil 3.

If the circuit configuration shown in FIG. 1 is modified such that the current detecting resistor 9 is connected directly in series with the field coil 3, it would be possible to detect and output an exact value of the field current flowing through the field coil 3. In this modified configuration, however, potential at an output circuit of the current detecting resistor 9, or at an input stage of the A/D converter circuit 15, becomes high. This makes it necessary to take measures to enhance insulation properties of the output circuit of the current detecting resistor 9, resulting in an increase in the size and cost of the automotive generator control apparatus.

The present embodiment of the invention is intended to provide an automotive generator control apparatus capable of delivering a digital output of which waveform closely duplicates that of the field current flowing through the field coil 3 with a simple circuit configuration.

Although the digital field current detection value obtained by the A/D converter circuit 15 of the present embodiment of the invention lags the field current (FIG. 4A) actually flowing through the field coil 3 with respect to a crest value, the output waveform of the A/D converter circuit 15 is a waveform obtained by smoothing the actual field current as shown in FIG. 4B. Therefore, the automotive generator control apparatus of the embodiment provides sufficient usefulness if the digital field current detection value output from the A/D converter circuit 15 is efficiently used by the external control unit 21 of the vehicle. In other words, since the A/D converter circuit 15 itself has a smoothing function, smoothing means which may be incorporated in the external control unit 21 in a succeeding stage can be greatly simplified, contributing thereby to a reduction in size and cost of overall control system.

It would be appreciated from the foregoing discussion that even if the automotive generator control apparatus of the first embodiment is installed at a site exposed to harsh ambient noise conditions, the control apparatus can output a highly reliable digital field current detection value to the external control unit 21. Additionally, the A/D converter circuit 15 of the first embodiment, configured with a low level of insulation and, thus, in compact size and at low cost, can deliver the digital field current detection value closely duplicating the waveform of the field current actually flowing through the field coil 3.

Second Embodiment

While the automotive generator control apparatus of the first embodiment is configured such that both the reset signal P1 and the transfer signal P2 are generated every PWM control operation cycle, an automotive generator control apparatus of a second embodiment is configured such that the transfer signal P2 is generated at intervals of a specific plural number of cycles of the PWM control operation. It is possible to make the waveform of the output (digital field current detection value) of the A/D converter circuit 15 more closely duplicate the waveform of the field current actually flowing through the field coil 3 by properly setting the aforementioned specific plural number of cycles of the PWM control operation based on a conducting time constant of the field coil 3.

If any of the electric loads 5 connected to the voltage regulator 4 is turned off (interrupted), the output voltage of the automotive generator increases. Should this situation occur, the ON period of the transistor 7 becomes shorter or equal to 0 and, as a consequence, the field current value detected based on the voltage applied to the current detecting resistor 9 rapidly decreases or becomes equal to 0. In this situation, however, the field current continues to flow through the field coil 3 due to the time constant thereof, so that the difference between the actual field current and the field current detection value output from the A/D converter circuit 15 tends to increase.

In the automotive generator control apparatus of the second embodiment, however, the intervals at which the transfer signal P2 is generated can be adjusted by properly setting the aforementioned specific plural number of cycles of the PWM control operation so that the field current detection value output from the A/D converter circuit 15 varies with a large time constant. This arrangement of the embodiment serves to prevent a rapid decrease in the field current detection value output from the A/D converter circuit 15 when any of the electric loads 5 connected to the voltage regulator 4 is turned off. With this arrangement, the control apparatus can monitor true behavior of the automotive generator and deliver the digital field current detection value closely duplicating the field current actually flowing through the field coil 3.

Third Embodiment

Figure 5:
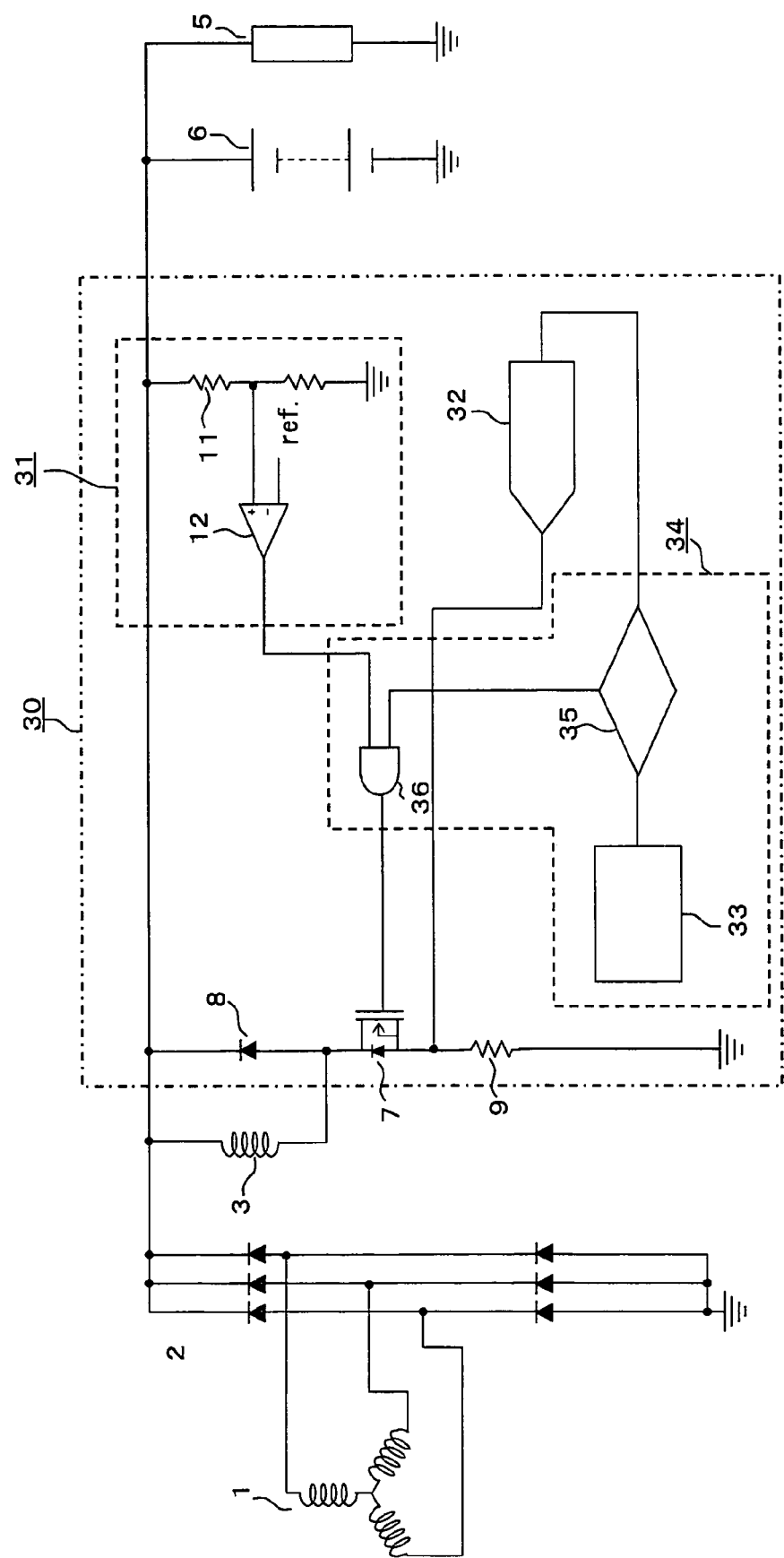
FIG. 5 is a block diagram of a control apparatus for controlling an automotive generator installed on a vehicle according to a third embodiment of the invention.

FIG. 5 is a block diagram of a control apparatus for controlling an automotive generator installed on a vehicle according to a third embodiment of the invention.

One known technique used in a control apparatus for an automotive AC generator for suppressing load torque exerted on a vehicle engine is to limit the field current so that the value of the field current does not exceed a specific level. The automotive generator control apparatus of the third embodiment features this kind of field current limiting function.

Now, a voltage regulator 30 provided with the aforementioned field current limiting function is described with reference to FIG. 5. The voltage regulator 30 includes a voltage control circuit 31, an A/D converter circuit 32 and a current limiting circuit 34. Like the voltage control circuit 10 of the foregoing embodiments, the voltage control circuit 31 outputs a result of comparison (logic operation) obtained by a comparator 12 by comparing a divided value of a DC output voltage of the voltage regulator 30 fed from a resistance type voltage divider 11 and a reference voltage. Like the A/D converter circuit 15 of the foregoing embodiments, the A/D converter circuit 32 outputs a digital field current detection value obtained by converting an analog field current detection value fed from a current detecting resistor 9 into a digital value.

The current limiting circuit 34 serving as a current limiter includes a current limit value memory 33, a comparator circuit 35 and an AND circuit 36. The current limit value memory 33 stores a current limit value in digital form. The comparator circuit 35 compares the digital field current detection value fed from the A/D converter circuit 32 and the digital current limit value fed from the current limit value memory 33. If the digital field current detection value is equal to or smaller than the digital current limit value, the comparator circuit 35 outputs a High (H) level signal, and if the digital field current detection value is larger than the digital current limit value, the comparator circuit 35 outputs a Low (L) level signal. Thus, when the field current detection value is equal to or smaller than the current limit value, the AND circuit 36 outputs an ON/OFF drive signal corresponding to a duty factor fed from the voltage control circuit 31, and when the field current detection value is larger than the current limit value, the AND circuit 36 outputs a signal which forcibly turns off the transistor 7.

Figure 6:
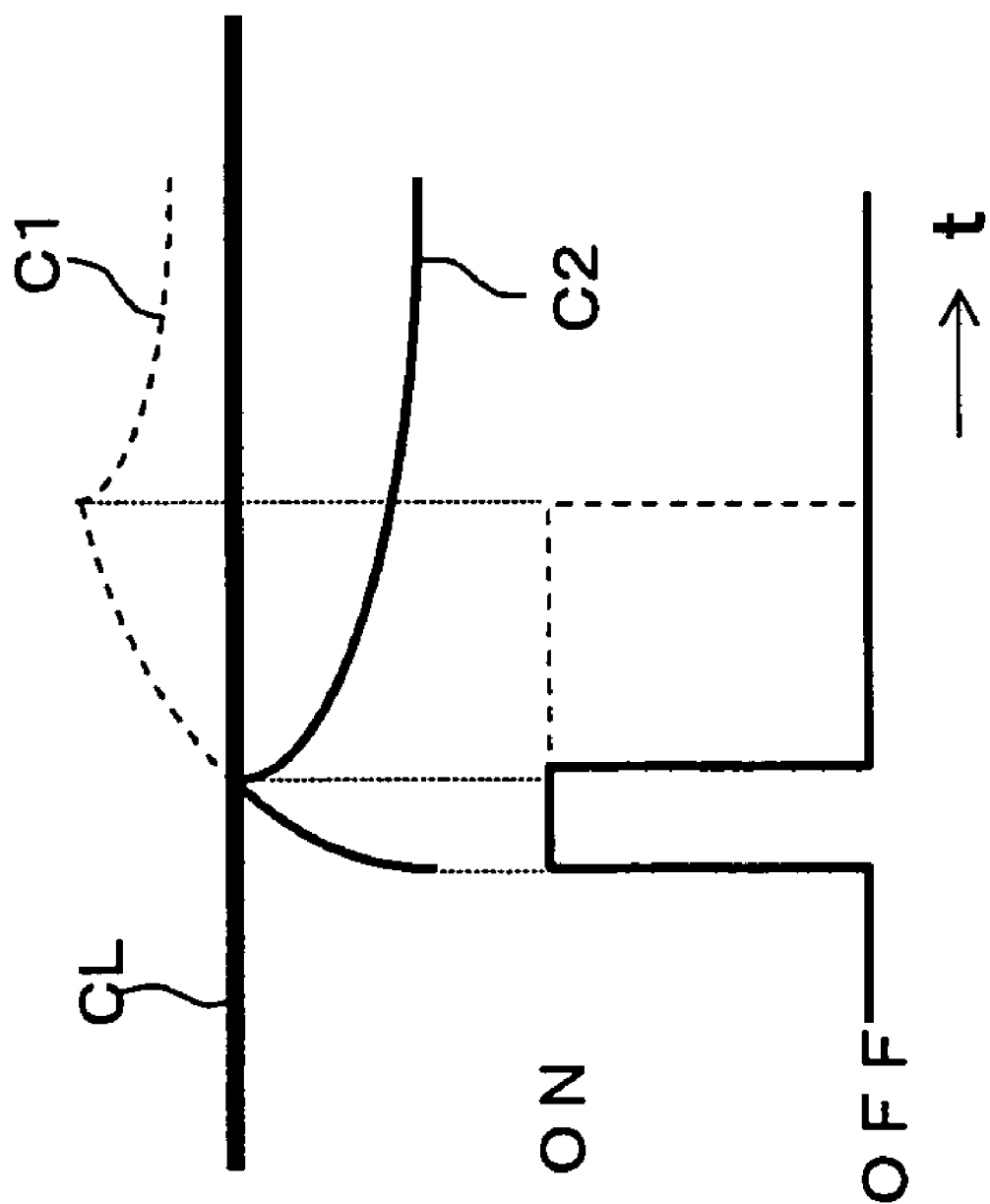
FIGS. 6A and 6B are diagrams showing operation executed by a field current limiting function.

FIGS. 6A and 6B are diagrams showing operation executed by the aforementioned field current limiting function. Referring to FIG. 6A, a thick solid line marked by CL shows the level of the current limit value, a broken line marked by C1 shows the waveform of the field current obtained when the field current limiting function is not implemented, and a thin solid line marked by C2 shows the waveform of the field current obtained when the field current limiting function is implemented.

The automotive generator control apparatus of the above-described third embodiment prevents the occurrence of overcurrent exceeding the current limit value flowing through the field coil 3 in a reliable fashion due particularly to the provision of the current limiting circuit 34. Also, since a desired current limit value can be set as an easy-to-store digital value and the digital field current detection value is compared directly with the current limit value stored in the current limit value memory 33, the automotive generator control apparatus, in particular the current limiting circuit 34, can be made with a simple circuit configuration at low cost, yet providing improved reliability.

Fourth Embodiment

Figure 7:
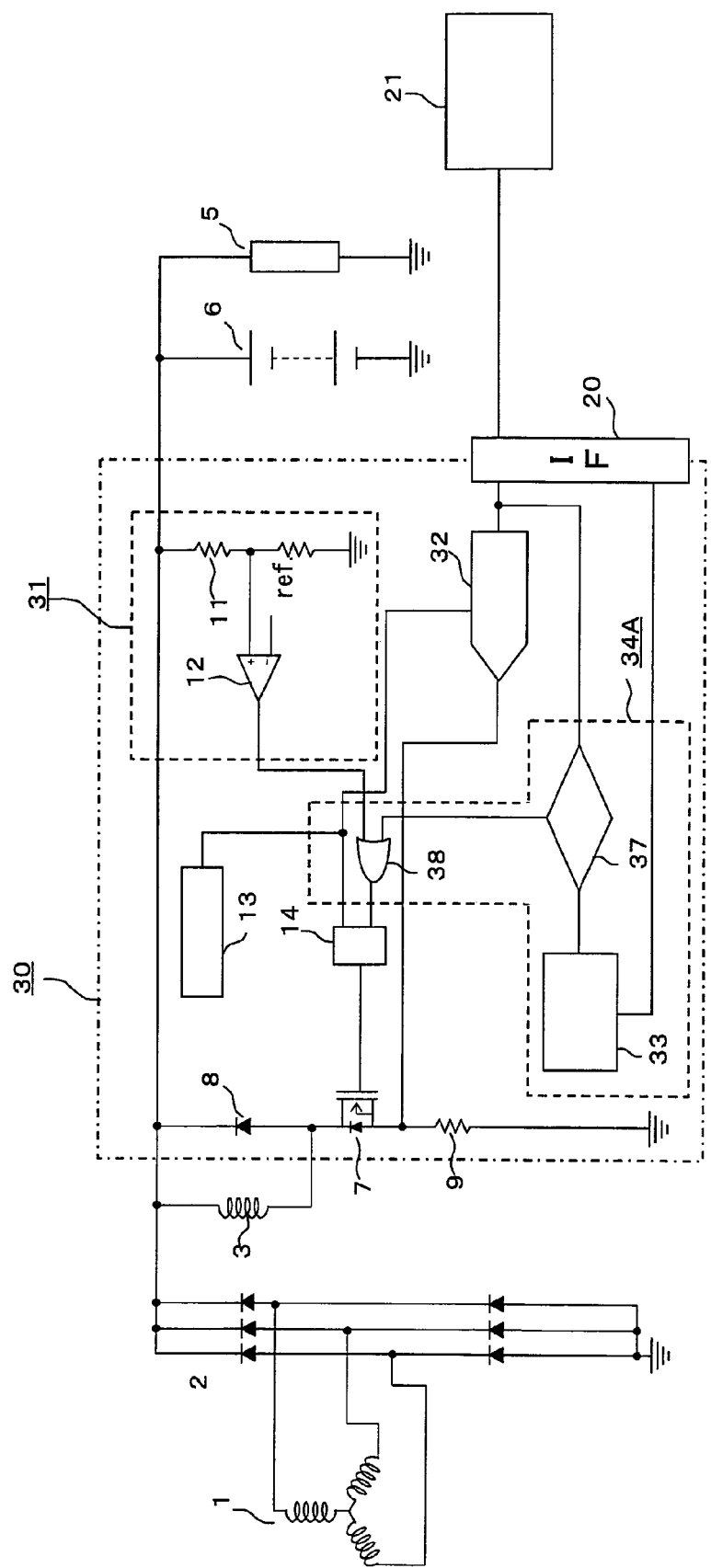
FIG. 7 is a block diagram of a control apparatus for controlling an automotive generator installed on a vehicle according to a fourth embodiment of the invention.

FIG. 7 is a block diagram of a control apparatus for controlling an automotive generator installed on a vehicle according to a fourth embodiment of the invention.

While the automotive generator control apparatus of this embodiment also has a field current limiting function like that of the third embodiment, the automotive generator control apparatus of the fourth embodiment offers an additional function which makes it possible to overwrite an already stored current limit value from the external control unit 21. This function satisfies the need to set the current limit value from the external control unit 21, or the ECU of the vehicle, according to engine operating conditions.

Referring to FIG. 7, a voltage regulator 30 of the fourth embodiment includes a voltage control circuit 31, an A/D converter circuit 32 and a current limiting circuit 34A. The voltage control circuit 31 and the A/D converter circuit 32 are the same as those of the third embodiment except that a digital output value of the A/D converter circuit 32 is transmitted to the external control unit 21 via a communication interface 20 as in the first embodiment.

The current limiting circuit 34A serving as a current limiter includes a current limit value memory 33, an equality judgment circuit 37 and an OR circuit 38. The current limit value memory 33 stores the aforementioned current limit value in digital form. In this embodiment, the current limit value once stored in the current limit value memory 33 can be overwritten from the external control unit 21 via the communication interface 20 as mentioned above. The equality judgment circuit 37 compares the digital field current detection value fed from the A/D converter circuit 32 and the digital current limit value fed from the current limit value memory 33. If the digital field current detection value is equal to the digital current limit value, the equality judgment circuit 37 outputs an H level signal to the OR circuit 38.

Under normal operating conditions where the field current detection value is less than the current limit value, the two values do not equal each other, so that a logic circuit 14 outputs an ON/OFF drive signal corresponding to a duty factor to a transistor 7 based on a signal fed from the voltage control circuit 31. As the field current detection value increases and exceeds the current limit value, the two values equal each other at a specific point in time. At this point in time, the logic circuit 14 is reset by the H level signal output from the equality judgment circuit 37, and the logic circuit 14 outputs a signal which turns off the transistor 7.

While the current limiting circuit 34A includes the equality judgment circuit 37 for detecting an overcurrent by judging whether the digital field current detection value fed from the A/D converter circuit 32 and the digital current limit value fed from the current limit value memory 33 coincide with each other, the aforementioned circuit configuration of the voltage regulator 30 may be modified such that the current limiting circuit 34A includes an adder instead of the equality judgment circuit 37. The automotive generator control apparatus thus modified produces completely the same advantages as that of the fourth embodiment. Specifically, the transistor 7 is forcibly turned off by using an inverted value (reversed polarity) of the sum of the two values given by the adder.

The automotive generator control apparatus of the above-described fourth embodiment prevents the occurrence of overcurrent exceeding the current limit value flowing through the field coil 3 in a reliable fashion due particularly to the provision of the current limiting circuit 34A. As in the foregoing third embodiment, a desired current limit value can be set as an easy-to-store digital value and, thus, the automotive generator control apparatus, in particular the current limiting circuit 34A, can be made with a simple circuit configuration at low cost, yet providing improved reliability. In addition, the automotive generator control apparatus of the fourth embodiment makes it possible to overwrite the already stored current limit value from the external control unit 21. This feature offers enhanced controllability of the vehicle.

In summary, a control apparatus for controlling an automotive generator in a first principal form of the invention includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value and outputting the digital value to an external control unit, and a voltage control circuit for outputting an ON/OFF drive signal to the switching device such that the DC output voltage of the automotive generator follows a specific reference voltage by pulse width modulation (PWM) control operation performed at recurring cycles. The A/D conversion device of this automotive generator control apparatus includes a counter, a digital-to-analog (D/A) converter for converting a digital output of the counter into an analog value, a comparator for comparing an output of the D/A converter and the analog field current detection value, a counter control circuit for controlling the counter according to an output of the comparator such that the counter counts up when the output of the D/A converter is less than the analog field current detection value, reset means for resetting the output of the counter at a point in time immediately following a rising edge of the ON/OFF drive signal at intervals of a specific number of PWM control operation cycles, and transfer means for transferring the output value of the counter to the external control unit at a point in time immediately preceding the rising edge of the ON/OFF drive signal at intervals of a specific number of PWM control operation cycles.

A control apparatus for controlling an automotive generator in a second principal form of the invention includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value, a current limit value memory for storing a specific current limit value in digital form, a voltage control circuit for outputting an ON/OFF drive signal to the switching device such that the DC output voltage of the automotive generator follows a specific reference voltage by PWM control operation performed at recurring cycles, and a current limiter to which an output of the A/D conversion device and the current limit value are input, whereby the current limiter turns off the switching device when the output value of the A/D conversion device exceeds the current limit value regardless of the ON/OFF drive signal. The A/D conversion device of this automotive generator control apparatus includes a counter, a D/A converter for converting a digital output of the counter into an analog value, a comparator for comparing an output of the D/A converter and the analog field current detection value, a counter control circuit for controlling the counter according to an output of the comparator such that the counter counts up when the output of the D/A converter is less than the analog field current detection value, reset means for resetting the output of the counter at a point in time immediately following a rising edge of the ON/OFF drive signal at intervals of a specific number of PWM control operation cycles, and transfer means for transferring the output value of the counter to the current limiter at a point in time immediately preceding the rising edge of the ON/OFF drive signal at intervals of a specific number of PWM control operation cycles.

In the aforementioned automotive generator control apparatus of the second principal form of the invention, the output of the transfer means is transmitted to an external control unit via a communication link, and the current limit value stored in the current limit value memory can be overwritten from the external control unit via the communication link.

This feature of the invention offers enhanced controllability of the vehicle.

In one feature of the invention, the reset means resets the output of the counter every cycle of the PWM control operation and the transfer means transfers the output value of the counter at intervals of a specific plural number of PWM control operation cycles.

This feature of the invention makes is possible to obtain a digital field current detection value closely duplicating the waveform of the field current actually flowing through the field coil with a simple circuit configuration at low cost.

In another feature of the invention, the aforementioned specific plural number of PWM control operation cycles is set based on a conducting time constant of the field coil such that the waveform of an output of the transfer means of the A/D conversion device resembles the waveform of the field current flowing through the field coil.

This feature of the invention makes is possible to obtain a digital field current detection value closely duplicating the waveform of the field current actually flowing through the field coil in a reliable fashion.

While the invention has been described with reference to the specific embodiments thereof in which the invention is applied to the field circuit of the automotive generator, the invention is applicable to other types of generators such as those in which a DC output voltage of the generator is supplied to the field coil. Additionally, the switching device need not necessarily be a transistor shown in the foregoing embodiments. Even if other type of switching device than the transistor is used in the generator, the invention is applicable in the same way as thus far discussed, yet offering the same advantages as in the foregoing embodiments.

What is claimed is:

1. A control apparatus for controlling an automotive generator, said control apparatus comprising:
   a field coil to which a DC output voltage of the automotive generator is supplied;
   a switching device connected in series with said field coil, whereby switching on/off operation of said switching device controls a field current flowing through said field coil;
   a diode connected in parallel with said field coil for recirculating the field current flowing through said field coil when said switching device is in an OFF state;
   a field current detector for outputting a voltage generated by a detecting device which is connected in series with said switching device as an analog field current detection value;
   an A/D conversion device for converting the analog field current detection value detected by said field current detector into a digital value and outputting said digital value to an external control unit; and
   a voltage control circuit for outputting an ON/OFF drive signal to said switching device such that the DC output voltage of the automotive generator follows a specific reference voltage by PWM control operation performed at recurring cycles;
   wherein said A/D conversion device includes:
      a counter;
      a D/A converter for converting a digital output of said counter into an analog value;
      a comparator for comparing an output of said D/A converter and the analog field current detection value;
      a counter control circuit for controlling said counter according to an output of said comparator such that said counter counts up when the output of said D/A converter is less than the analog field current detection value;
      reset means for resetting the output of said counter at a point in time immediately following a rising edge of said ON/OFF drive signal at intervals of a specific number of PWM control operation cycles; and
      transfer means for transferring the output value of said counter to said external control unit at a point in time immediately preceding the rising edge of said ON/OFF drive signal at intervals of a specific number of PWM control operation cycles.

2. A control apparatus for controlling an automotive generator, said control apparatus comprising:
   a field coil to which a DC output voltage of the automotive generator is supplied;
   a switching device connected in series with said field coil, whereby switching on/off operation of said switching device controls a field current flowing through said field coil;
   a diode connected in parallel with said field coil for recirculating the field current flowing through said field coil when said switching device is in an OFF state;

a field current detector for outputting a voltage generated by a detecting device which is connected in series with said switching device as an analog field current detection value;

an A/D conversion device for converting the analog field current detection value detected by said field current detector into a digital value;

a current limit value memory for storing a specific current limit value in digital form;

a voltage control circuit for outputting an ON/OFF drive signal to said switching device such that the DC output voltage of the automotive generator follows a specific reference voltage by PWM control operation performed at recurring cycles; and a current limiter to which an output of said A/D conversion device and the current limit value are input, whereby said current limiter turns off said switching device when the output value of said A/D conversion device exceeds the current limit value regardless of the ON/OFF drive signal;

wherein said A/D conversion device includes:

a counter;

a D/A converter for converting a digital output of said counter into an analog value;

a comparator for comparing an output of said D/A converter and the analog field current detection value;

a counter control circuit for controlling said counter according to an output of said comparator such that said counter counts up when the output of said D/A converter is less than the analog field current detection value;

reset means for resetting the output of said counter at a point in time immediately following a rising edge of said ON/OFF drive signal at intervals of a specific number of PWM control operation cycles; and transfer means for transferring the output value of said counter to said current limiter at a point in time immediately preceding the rising edge of said ON/OFF drive signal at intervals of a specific number of PWM control operation cycles.

3. The control apparatus according to claim 2, wherein the output of said transfer means is transmitted to an external control unit via a communication link, and the current limit value stored in said current limit value memory can be overwritten from said external control unit via the communication link.

4. The control apparatus according to claim 1, wherein said reset means resets the output of said counter every cycle of the PWM control operation and said transfer means transfers the output value of said counter at intervals of a specific plural number of PWM control operation cycles.

5. The control apparatus according to claim 4, wherein said specific plural number of PWM control operation cycles is set based on a conducting time constant of said field coil such that the waveform of an output of said transfer means of said A/D conversion device resembles the waveform of the field current flowing through said field coil.

6. The control apparatus according to claim 2, wherein said reset means resets the output of said counter every cycle of the PWM control operation and said transfer means transfers the output value of said counter at intervals of a specific plural number of PWM control operation cycles.

7. The control apparatus according to claim 6, wherein said specific plural number of PWM control operation cycles is set based on a conducting time constant of said field coil such that the waveform of an output of said transfer means of said A/D conversion device resembles the waveform of the field current flowing through said field coil.

* * * * *